(12) United States Patent
Giesinger

(10) Patent No.: US 9,702,125 B2
(45) Date of Patent: Jul. 11, 2017

(54) RECREATIONAL VEHICLE WINTERIZING COUPLING

(71) Applicant: Leroy Giesinger, Momson, CO (US)

(72) Inventor: Leroy Giesinger, Momson, CO (US)

(*) Notice: Subject to any disclaimer, the term of this patent is extended or adjusted under 35 U.S.C. 154(b) by 152 days.

(21) Appl. No.: 14/455,062

(22) Filed: Aug. 8, 2014

(65) Prior Publication Data

US 2016/0040403 A1 Feb. 11, 2016

(51) Int. Cl.
*E03B 7/12* (2006.01)
*B60R 15/00* (2006.01)
*F16L 37/48* (2006.01)
*F16L 33/02* (2006.01)

(52) U.S. Cl.
CPC ............... *E03B 7/12* (2013.01); *B60R 15/00* (2013.01); *F16L 33/02* (2013.01); *F16L 37/48* (2013.01); *Y10T 137/6855* (2015.04)

(58) Field of Classification Search
CPC ..... E03B 7/12; B60R 15/00; Y10T 137/6855; F16L 33/02; F16L 37/0841; F16L 37/088; F16L 37/48; F16L 41/06; B67D 1/06; E03C 1/0404
USPC ........................................................ 285/180
See application file for complete search history.

(56) References Cited

U.S. PATENT DOCUMENTS

| | | | | |
|---|---|---|---|---|
| 715,542 A | * | 12/1902 | Blumer .................. | F16L 37/48 285/180 |
| 1,050,615 A | * | 1/1913 | Coates .................. | F16L 37/48 285/252 |
| 1,113,736 A | * | 10/1914 | Bayer .................... | F16L 37/48 285/180 |
| 1,450,108 A | * | 3/1923 | Munslow ............... | F16L 37/48 285/356 |
| 2,654,618 A | * | 10/1953 | Kurth .................... | F16L 37/48 248/212 |
| 3,929,154 A | * | 12/1975 | Goodwin ............... | B60R 15/00 137/1 |
| 4,286,617 A | * | 9/1981 | Bedient ................. | B60R 15/00 137/334 |
| 4,298,021 A | * | 11/1981 | Bozeman ............... | B60R 15/00 137/334 |
| 4,531,538 A | * | 7/1985 | Sandt .................... | E03B 7/10 137/301 |
| 5,028,077 A | * | 7/1991 | Hurst .................... | F16L 27/107 285/252 |
| 5,318,059 A | * | 6/1994 | Lyons ................... | E03B 7/12 137/340 |

(Continued)

*Primary Examiner* — Kevin Murphy
(74) *Attorney, Agent, or Firm* — The Law Office of Jerry D. Haynes

(57) ABSTRACT

A RV winterizing method that introduces antifreeze to a RV system using a reverse flow procedure by using fittings or a coupling, where the coupling includes a band composed from a strip with a set of ends which over lap when the strip wraps around itself, a knob situated above the set of ends at a top portion of the band, wherein the knob adjust the band. A semi-tubular fitting is braced within the band where the semi-tubular fitting includes a set of lips extending up an inner wall of the band. A hole arranged at a central bottom portion of the semi-tubular fitting. Finally, a fitting continuing from the hole wherein the band attaches to a faucet to create a watertight seal, and enables a non-toxic antifreeze to flow through the fitting, into the faucet and into a plumbing system.

1 Claim, 3 Drawing Sheets

(56) References Cited

U.S. PATENT DOCUMENTS 5,488,968 A * 2/1996 Price .................... E03B 7/12
                                                                 137/1
5,676,182 A * 10/1997 McMullen, Jr. ......... E03B 7/12
                                                                 137/240
5,830,380 A * 11/1998 Cook .................... C09K 5/20
                                                                 137/301

* cited by examiner

RECREATIONAL VEHICLE WINTERIZING COUPLING

BACKGROUND OF THE INVENTION

Field of the Invention

The present invention relates to a coupling to attach to a faucet of a plumbing system in a recreational vehicle to enable a non-toxic antifreeze to be pumped into the plumbing system and to flush in a reverse direction through the recreational vehicle and a method of using the coupling according to the present invention.

Description of Related Art

The majority of recreational vehicles (RV) being used today contain the modern conveniences such as a kitchen sink and a bathroom complete with sink and shower and therefore have a plumbing system throughout the RV. If the RV is stored in a cold climate one faces the task of winterizing the RV each year. Winterizing is a process of draining the water out of the RV and installing RV antifreeze into the plumbing circuit to prevent it from freezing. This process of winterizing varies depending on how the RV plumbing was designed but in most cases can be a long process that requires the use of specialty tools, additional components such as a hot water by pass kit and a considerable amount of RV antifreeze. In any case, this process will vary from one RV to another and the process for doing so may be questionable or difficult for the RV owner figure out.

Generally, three methods exist for RV winterizing. One method is to simply put enough antifreeze into the fresh water hold tank to make it possible to run antifreeze through the lines like water. The problem with this method is the amount of RV antifreeze that is required. Bear in mind that an RV has two hold tanks, one for fresh water and one for hot water. When the fresh water hold tank is filled and the water pump turned on the first thing it does, by design is pump water to the hot water hold tank until it is filled, this is an automatic process and can't be controlled by the operator. The hot water hold tank can have a capacity of five or six gallons. Consequently, it would take in excess of five to six gallons to have enough antifreeze remaining to pump some of it through the lines and up to faucets. Therefore the drawback to this method is the amount of RV antifreeze required.

The next method is similar to the one explained above but employs the use of a hot water bypass kit. These kits use a combination of fittings and lines to hook the two lines that would normally go to the inlet and outlet of the hot water tank together. By doing so you are able bypass the hot water hold tank in an effort to reduce the amount of antifreeze needed to do the job. There are three drawbacks to this method. One is that it can be and generally is a lot of work to install the kit because access to the hot water hold tank is usually difficult. The kit also must be removed before using the RV in the following spring. The other drawback is that by bypassing the hot water hold tank no antifreeze gets into the tank to prevent any residual water from freezing. While winterizing usually involves draining this tank some residual water can be left behind, especially if the drain plug is not at the very bottom of the tank.

A third method involves installing a pump to the city water lines. In addition to having a fresh water hold tank most RV's have an inlet to which a pressurized line can be installed which is commonly referred to as "city water". In other words a hose for example can be installed to supply pressurized water to the RV so that when parked in an RV park the water being used is not coming from the fresh water hold tank but rather is coming from a pressurized source similar to a residential home. The benefit of this method is that the pump isn't needed when parked. As mentioned this method involves installing a pump to this line to pump antifreeze into this line. If the faucets in the RV are open while doing this the pump can pump antifreeze all the way up and through the faucets. The drawback to this method is that it too requires either the use of a bypass kit, which does not allow antifreeze into the hot water hold tank, or this method requires a large amount of RV antifreeze.

In addition, when the RV is being prepared for use the next spring or summer the antifreeze needs to be removed so as to not pollute the fresh water. Although it is non-toxic antifreeze it is not desirable to have it in the fresh water.

It would therefore be advantageous to have a system and method that takes the guesswork out of the winterizing process and would offer an easy and certain method to both winterize the RV and rinse out the majority of the antifreeze when it is being prepared for use the following year. It would also be advantageous that this method would not vary from one RV to another it would be the same for virtually any RV.

SUMMARY OF THE INVENTION

The present invention relates to a RV winterizing method that introduces antifreeze to a RV system using a reverse flow procedure. This method does not have any of the drawbacks associated with the three procedures listed above but does have a lot of advantages. The present invention makes it possible to introduce antifreeze or any like product into the outlet of a plumbing circuit. The method of the present invention enables reverse flow and forcing of the product through the entire plumbing circuit to leave a residual amount that will prevent freezing anywhere throughout the plumbing circuit in cold ambient temperatures. The present invention includes a pump, hydraulic circuit and a unique coupler and fittings that allow for adaptation onto the outlet of virtually any plumbing circuit. The present invention is adaptable to sinks, the showerhead and may even be used for a toilet. Pumping antifreeze in the manner according to the present invention allows a professional or a do it yourselfer to do a thorough job of winterizing in simple easy to understand steps. It allows you to pump antifreeze from a faucet for example through the water lines and to the source whether it is the hot water hold tank or the fresh water hold tank. The present invention allows the user to pump antifreeze directly to the source and reduces the amount of antifreeze needed to do a complete job. It should not take any more than one or two gallons of RV antifreeze to winterize any RV. And again, the present invention pumps antifreeze directly to the plumbing components and doesn't bypass any of the components therefore doing a more complete job and does away with the need for a bypass kit.

The present invention also uses the same tools and processes to rinse the antifreeze out of the lines and hold tanks in the same manner in preparation for using the RV the next season. Also another advantage of the present invention, since less antifreeze is used in winterizing the RV in the first place, therefore rinsing the antifreeze out is easier.

The present invention enables a user to easily winterize their recreational vehicle by attaching a winterizing coupling or fitting to a faucet. The winterizing coupling comprising a band composed from a strip with a set of ends which over lap when the strip wraps around itself, a knob situated above the set of ends at a top portion of the band, where the knob adjusts the band. A semi-tubular fitting is braced within the band where the semi-tubular fitting includes a set of lips extending up an inner wall of the band. A hole arranged at a central bottom portion of the semi-tubular fitting. Finally, an attachment fitting continuing from the hole, extending through a coordinating hole in the band, wherein the band attaches to a faucet to create a watertight seal, and enables a non-toxic antifreeze to flow through the fitting, into the faucet and into a plumbing system.

Another object of the primary invention is to enable the flow of the non-toxic antifreeze to go from the cold or hot water line of the faucet towards the water pump and water tanks These together with other aspects of the present invention, along with the various features of novelty that characterize the present invention, are pointed out with particularity in the claims annexed hereto and form a part of this present invention. For a better understanding of the present invention, its operating advantages, and the specific objectives attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

DETAILED DESCRIPTION OF THE DRAWINGS

The present invention relates to an apparatus for winterizing a recreational vehicle to prevent the pipes and lines of the RV from freezing and bursting during the cold winter months when the vehicle is not in use. A winterizing coupling enables a non-toxic antifreeze to flow through the plumbing system of the RV from a faucet towards a water pump and water tanks. By controlling the direction of the flow, less antifreeze is used and the components maintain connection without the need of the bypass kits. The winterizing coupling enables the non-toxic antifreeze to pump directly from the antifreeze container and into the plumbing system. This allows a user to quickly and more easily prepare their vehicle for non-use and storage in the wintertime.

Figure 1:
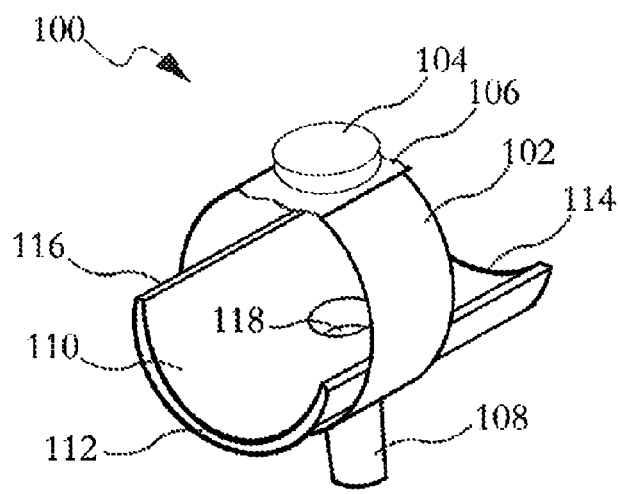
FIG. 1 depicts a perspective view of a winterizing coupling in accordance with an exemplary embodiment of the present invention.

Turning now descriptively to the drawings, referring to FIG. 1, a winterizing coupling (100) in accordance with an exemplary embodiment of the present invention is shown. The winterizing coupling may include a band (102), a knob (104), a fitting (108) and a semi-tubular coupling (110). The band (102) may wrap around a faucet of a recreational vehicle. The band (102) may be made from a metallic material or a plastic. The knob (104) may adjust or tighten the band (102) around the faucet. The band (102) is a flat strip of material which comprises a set of ends. When the strip wraps around itself it may create a circle or band with overlapping ends. Thus, the end (106) moves away or towards the knob depending on whether the band (102) is being tightened or loosened.

The semi-tubular coupling (110) fits within the band (102), and extends beyond the band (102) to a set of edges (112, 114), a first edge (112) at a front portion of the semi-tubular coupling (110) and a second edge (114) at a back portion of the semi-tubular coupling (110) running parallel to the band (102). The semi-tubular coupling (110) may curve up the sides of the band (102) to form a set of lips (116) (hereinafter lips) on each side. The lips (116) may tightly secure the semi-tubular fitting within (110) the inner walls of the band (102). Within a central portion of the semi-tubular coupling (110), where the semi-tubular coupling (110) and the band (102) overlap, may be a hole (118). The hole (118) extends down to the fitting (108) through a coordinating hole in the band (102). The fitting (108) may enable a passage for a non-toxic antifreeze to pass through the hole (118). The semi-tubular coupling (110) and the fitting (108) may be composed of the same material for example a plastic like PVC, rubber or metal depending on the preferences and costs of a user. A silicone, plastic or rubber material may provide the semi-tubular coupling (110) and the fitting (108) with optimal flexibility to allow the winterizing coupling to create an airtight seal around the faucet.

Figures 2, 3:
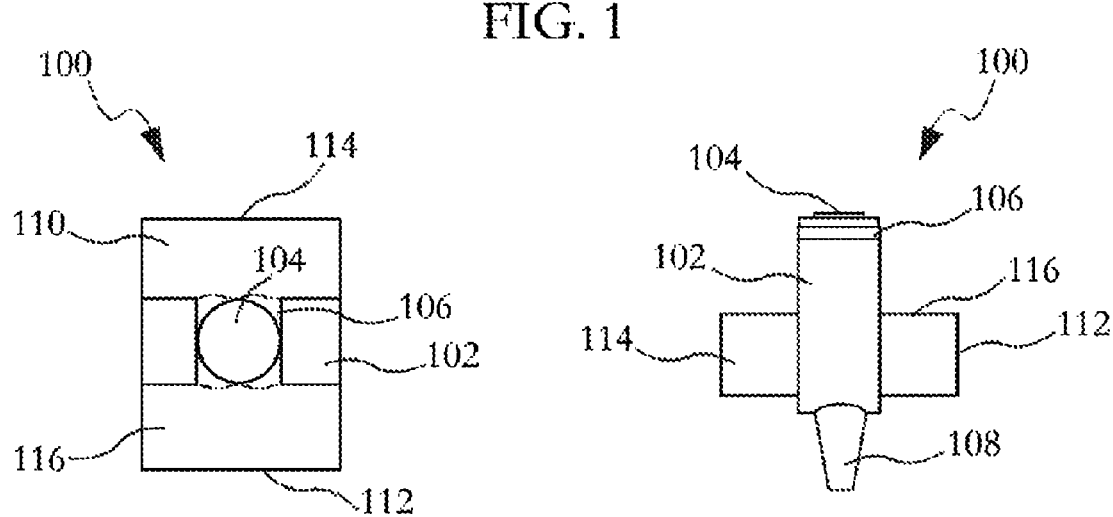
FIG. 2 depicts a top view of a winterizing coupling in accordance with an exemplary embodiment of the present invention.
FIG. 3 depicts a side view of a winterizing coupling in accordance with an exemplary embodiment of the present invention.

Referring to FIG. 2, a top view of the winterizing coupling (100) is shown in accordance with an exemplary embodiment of the present invention. The knob (104) may be located in a top central portion of the band (102). Additionally, FIG. 2 illustrates how the first edge (112) and the second edge (114) may extend equally from the band (102).

Referring to FIG. 3, a side view of the winterizing coupling (100) is shown in accordance with an exemplary embodiment of the present invention. The semi-tubular fitting may fit within the band (102) in an elevated position to enable the semi-tubular fitting to securely fit within the band (102) after tightening by the knob (104).

Figure 4:
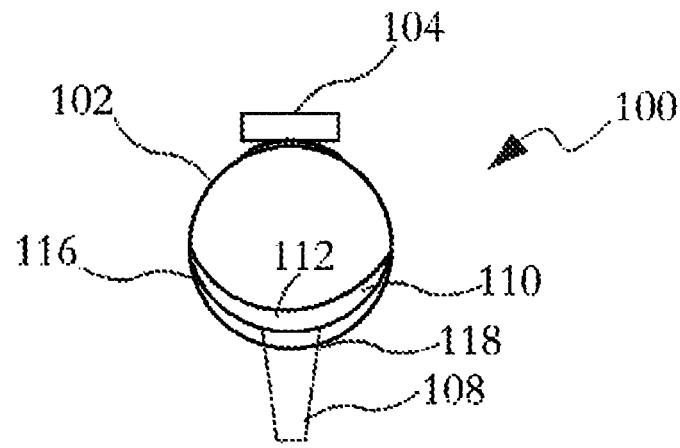
FIG. 4 depicts a front view of a winterizing coupling in accordance with an exemplary embodiment of the present invention.

Referring to FIG. 4, a front view of the winterizing coupling (100) is shown in accordance with an exemplary embodiment of the present invention. The fitting (108) is shown meeting the bottom portion of the semi-tubular fitting through the band (102). The fitting (108) is illustrated protruding through the band (102) through the coordinating hole (118) in the band (102). FIG. 4 better illustrates the space between the band (102) and the semi-tubular coupling (110).

Figure 5:
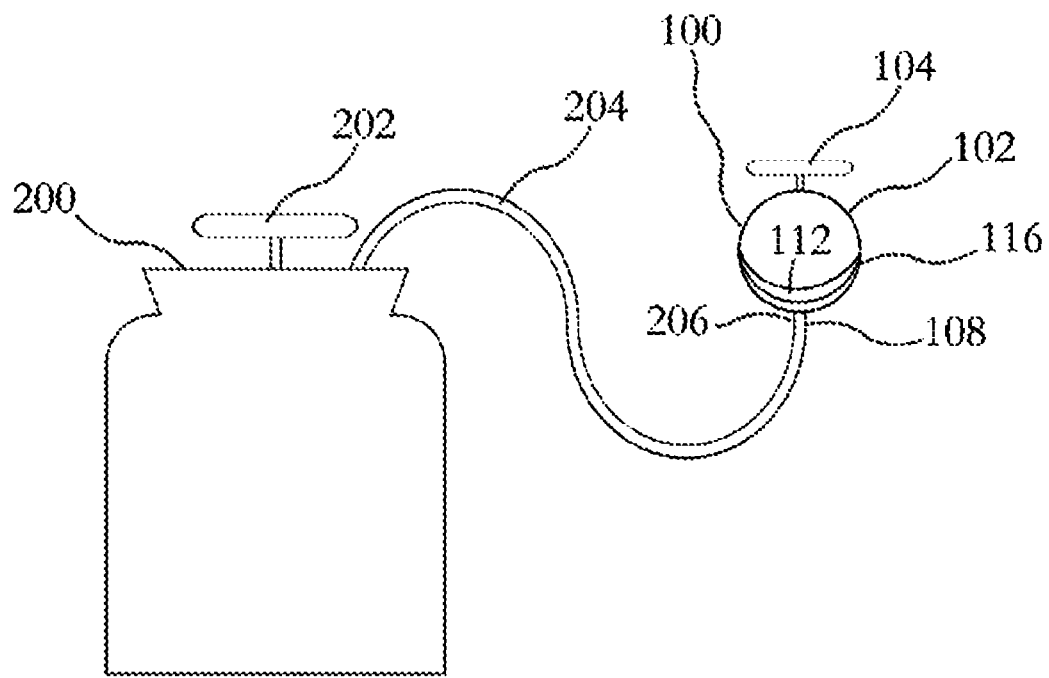
FIG. 5 depicts a perspective view of a winterizing coupling connected to an antifreeze container in accordance with an exemplary embodiment of the present invention.

Referring to FIG. 5, a perspective view of the winterizing coupling (100) connected to an antifreeze pump reservoir (200) is shown in accordance with an exemplary embodiment of the present invention. The antifreeze pump reservoir (200) may include a pump (202) attached to a hose (204). At the end of the hose is an attachment end (206) to secure around the fitting (108). The pump (202) may enable a non-toxic antifreeze solution to flow from the antifreeze pump reservoir (200), into the hose (204) and finally into the fitting (108).

Figure 6:
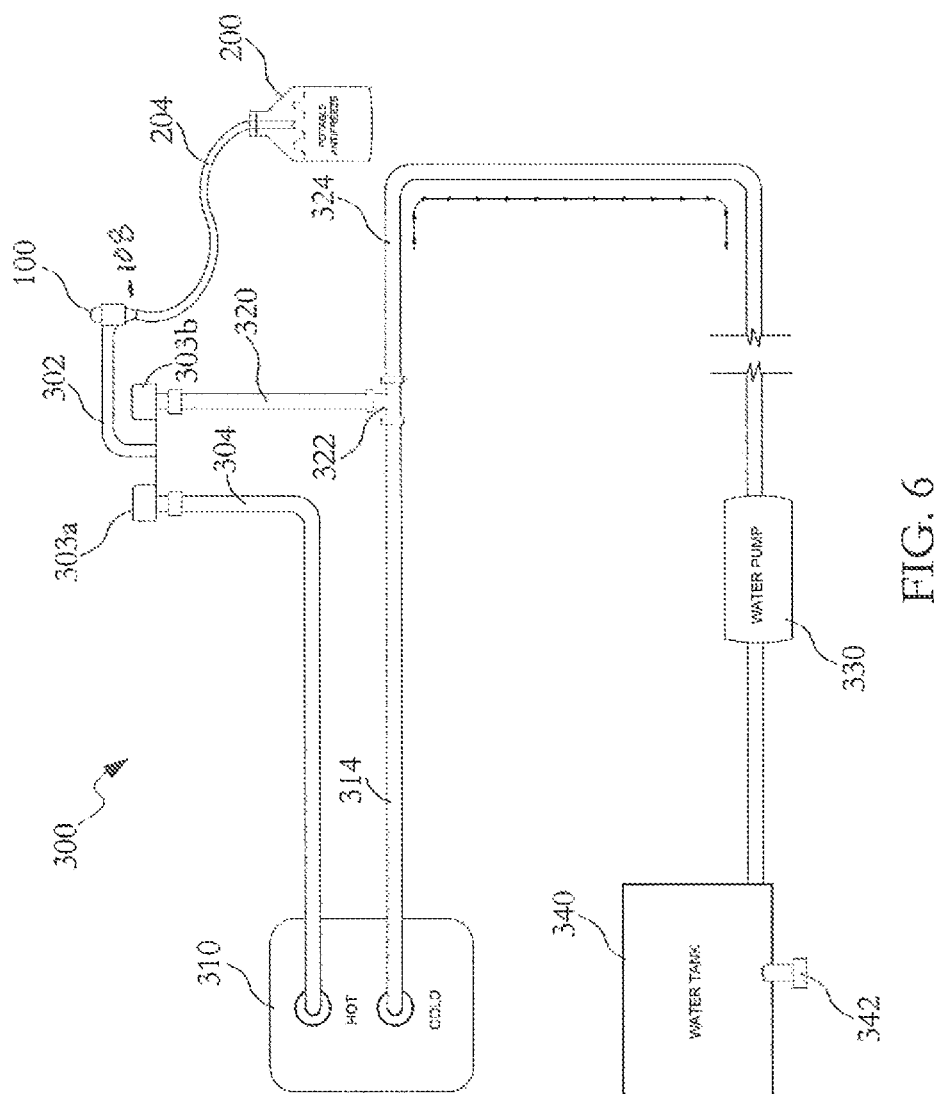
FIG. 6 depicts a diagram of a plumbing system in accordance with an exemplary embodiment of the present invention; and Like reference numerals refer to like parts throughout the description of several views of the drawings.

Referring to FIG. 6, a diagram of a plumbing system (300) of a recreational vehicle is shown in accordance with an exemplary embodiment of the present invention. The plumbing system (300) may include a faucet (302) with a hot water line (304) and a cold water line (320). The winterizing coupling (100) or a fitting attaches to the faucet (302). A hot water valve (303*a*) opens the faucet (302) to the hot water line (304). The hot water line (304) continues from a water heater (310).

Now following along the cold water line (320), the faucet (302) comprises a cold water valve (303*b*) to lead into the cold water line (320). The cold water line (320) continues to a T-joint (322), which attaches the cold water line (320) to a cold water pipe (324). The cold water pipe (324) continues into a water pump (330) and finally into a fresh water tank (340). When the winterizing coupling (100) or fitting is attached to the faucet (302), the hose (204) may be secured to the fitting to enable the non-toxic antifreeze solution to pump from the antifreeze pump reservoir (200) into the plumbing system (300). The non-toxic antifreeze flows in a reverse manner, from the faucet (302) to the water pump (330) to prepare the recreational vehicle for cold temperatures and to prevent freezing.

To use the winterizing coupling, the user initially drains the water out of the RV's fresh water hold tank and the hot water heater reservoir and then the coupler or fitting (108) attaches to the faucet (302). The user must next fill the pump reservoir (200) with antifreeze and attach the hose (204) to the fitting (108). The pump (200) attaches on the other end of the hose (204). Next the hot water valve on the faucet (303*a*) is opened. When the pump is cycled, it pumps the RV antifreeze through the hose (204), through the coupler or fitting (100), through the faucet (302), through the hot water valve (303*a*), through the hot water line (304) and into the hot water tank (310). The user next closes the hot water valve (303*a*) and opens the cold-water valve (303*b*). Now when the pump is cycled it pumps the antifreeze through the hose (204), through the coupler or fitting (100), through the faucet (302), through the cold water valve (303*b*), through the cold water line (320), through the water pump (330) and to the fresh water tank (340). This process may simply be repeated for all of the water sources in the RV. The process for the toilet may differ slightly, since it would employ a different type of fitting and the flush valve would have to be held open while the pump was cycled and the antifreeze was introduced.

This simplified process allows the most thorough method of winterizing and does not bypass any of the components with possibly one exception. If in fact a user cannot pump through the water pump due to particular characteristics of the pump, a procedure variation may be employed. The user pumps antifreeze up to the pump, and to complete the process, simply adds a small amount of antifreeze as necessary to the fresh water hold tank by pouring it in. In conclusion, this method provides an easier method for winterization that does not vary from one RV to another, a more thorough method because it would not bypass any components and a method that uses less antifreeze. The present invention provides a method of removing the antifreeze when the time comes, a feature that's never been available with other methods.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A method for winterizing a recreational vehicle plumbing system comprising the steps of:
   a. draining the water out of a fresh water hold tank and a hot water heater reservoir within the recreational vehicle plumbing system;
   b. attaching a fitting to a faucet within the recreational vehicle plumbing system, wherein the step of attaching includes placing a fitting band and a semi-tubular coupling within the fitting band around the faucet and adjusting the fitting band with a knob to tighten around the faucet where the band includes a coordinating hole, wherein the fitting protrudes through the coordinating hole;
   c. filling a pump reservoir with antifreeze;
   d. attaching a first end of a hose to the fitting;
   e. attaching the pump reservoir to a second end of the hose;
   f. opening a hot water valve on the faucet;
   g. cycling a pump connected to the pump reservoir, where the pump pumps the antifreeze through the hose, through the fitting, through the faucet, through the hot water valve, through a hot water line and into the hot water heater reservoir;
   h. closing the hot water valve;
   i. opening a cold-water valve; and
   j. cycling the pump connected to the pump reservoir, where the pump pumps the antifreeze through the hose, through the fitting, through the faucet, through the cold water valve, through the cold water line, through a water pump and to the fresh water hold tank.

* * * * *